(12) United States Patent
Yang et al.

(10) Patent No.: US 11,138,509 B2
(45) Date of Patent: Oct. 5, 2021

(54) REDUCING ELECTRONIC RESOURCE CONSUMPTION USING DATA INFERENCE

(71) Applicant: Microsoft Technology Licensing, LLC, Redmond, WA (US)

(72) Inventors: Gloria Yang, San Francisco, CA (US); Ming Yan, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1027 days.

(21) Appl. No.: 15/699,828

(22) Filed: Sep. 8, 2017

(65) Prior Publication Data

US 2019/0080249 A1  Mar. 14, 2019

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2010/0114988 A1* | 5/2010 | Linn | G06Q 10/10 707/805 |
| 2011/0225048 A1* | 9/2011 | Nair | G06Q 50/01 705/14.66 |
| 2015/0235181 A1* | 8/2015 | Chen | G06Q 10/1053 705/321 |
| 2017/0004453 A1* | 1/2017 | Lin | H04L 67/22 |
| 2018/0359172 A1* | 12/2018 | Yadav | H04L 41/147 |

* cited by examiner

*Primary Examiner* — Vincent Gonzales
(74) *Attorney, Agent, or Firm* — Schwegman Lundberg & Woessner, P.A.

(57) ABSTRACT

Techniques for inferring data to improve the accuracy and completeness of information retrieval are disclosed herein. In some embodiments, a data inference system detects a lack of employment type data for a profile of a user on an online service, with the employment type data identifying at least one type of employment in which the user is interested. In some embodiments, based on the detecting of the lack of employment type data for the profile of the user, the data inference system generates the employment type data based on an inference model and inference data, with the inference data comprising at least one of profile data of the user and a history of the user's interactions with the online service, and the data inference system performs a function of the online service using the generated employment type data.

20 Claims, 11 Drawing Sheets

CAREER INTERESTS

WHAT JOB TITLES ARE YOU CONSIDERING?
+ ADD TITLE ← 410

WHAT LOCATIONS WOULD YOU WORK IN?
CUPERTINO, CALIFORNIA    + ADD LOCATION ← 420

WHAT TYPES OF JOBS ARE YOU OPEN TO?
- ☐ FULL-TIME
- ☐ PART-TIME ← 430
- ☐ INTERNSHIP
- ☐ REMOTE
- ☐ FREELANCE
- ☐ CONTRACT

WHICH INDUSTRIES DO YOU PREFER?
+ ADD INDUSTRY ← 440

WHAT SIZE COMPANY WOULD YOU LIKE TO WORK FOR? (# OF EMPLOYEES)
| 1 | TO | 10,000+ | ← 450

*FIG. 4*

DATA VERIFICATION REQUEST

WE NOTICED THAT YOUR PROFILE IS LACKING DATA INDICATING WHAT TYPES OF JOBS YOU ARE OPEN TO.

WE HAVE INFERRED THAT YOU MIGHT BE INTERESTED IN THE FOLLOWING TYPES OF JOBS:

FULL-TIME ← 810

IS THIS INFERENCE CORRECT? ← 820

822 ◯ YES

824 ◯ NO, AND THE TYPES OF JOBS THAT I AM INTERESTED IN INCLUDE:
- ☐ FULL-TIME
- ☐ PART-TIME ← 830
- ☐ INTERNSHIP
- ☐ REMOTE
- ☐ FREELANCE
- ☐ CONTRACT 840 ( SUBMIT )

*FIG. 8*

REDUCING ELECTRONIC RESOURCE CONSUMPTION USING DATA INFERENCE

TECHNICAL FIELD

The present application relates generally to the use of inference models in information retrieval and, in one specific example, to methods and systems of reducing electronic resource consumption by inferring data to improve the accuracy and completeness of information retrieval.

BACKGROUND

Online services, such as social networking services, often suffer from a lack of data for member profiles. This lack of data can cause technical problems in the performance of the online service. For example, in situations where the online service is performing a search based on search criteria for a certain type of data, members are often omitted from the search because their profiles lack that type of data even though they would have satisfied the search criteria if the members had included the corresponding data for their profiles. As a result, the accuracy and completeness of the search results are diminished. Additionally, since otherwise relevant search results are omitted, users often spend a longer time on their search, consuming electronic resources (e.g., network bandwidth, computational expense of server performing search). Other technical problems from such omissions can arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 4 illustrates a graphical user interface (GUI) displaying options for profile data of a member of an online service, in accordance with an example embodiment.

FIG. 8 illustrates a GUI displaying a verification request, in accordance with an example embodiment.

DETAILED DESCRIPTION

Figure 1:
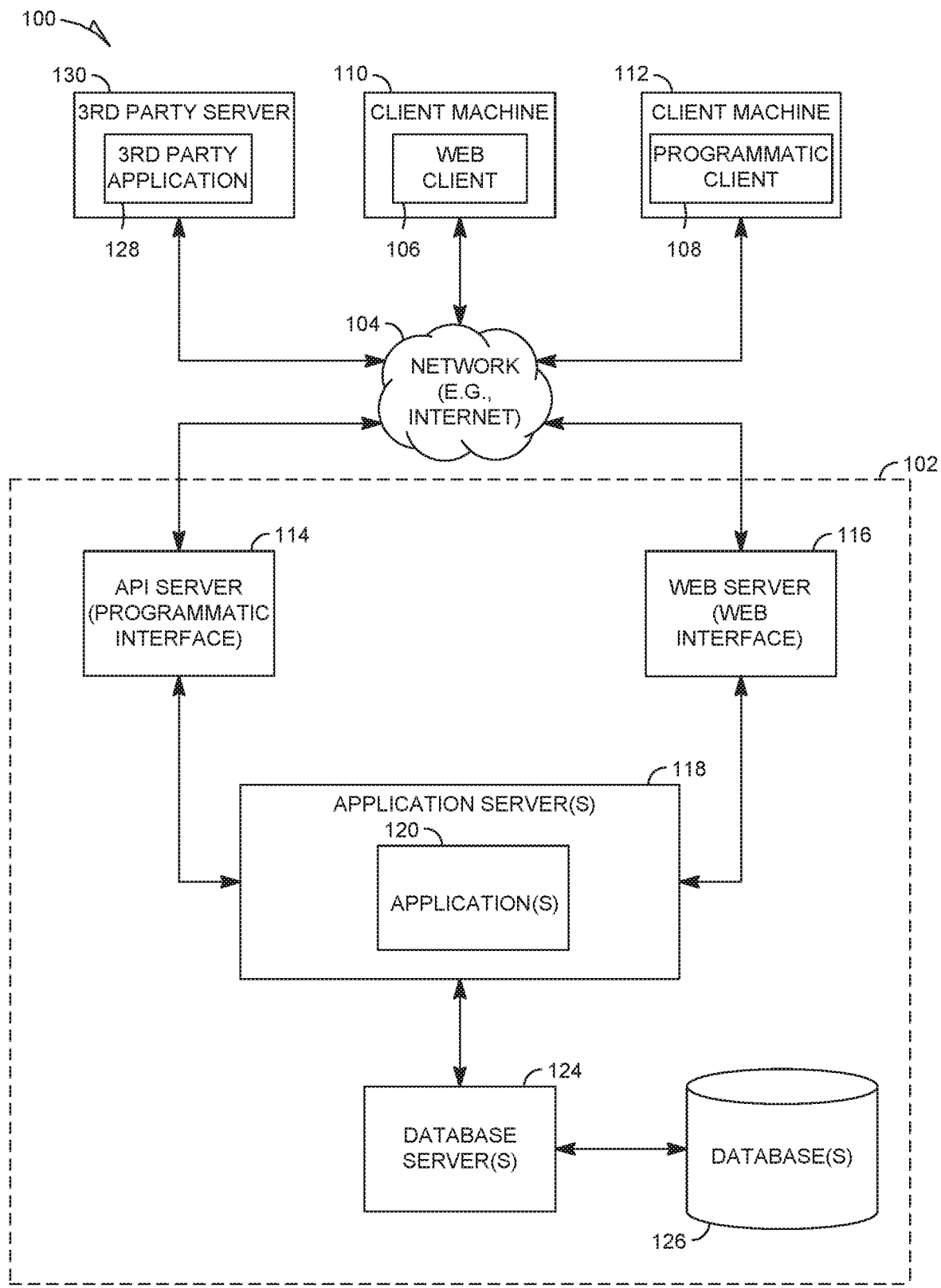
FIG. 1 is a block diagram illustrating a client-server system, in accordance with an example embodiment.

Example methods and systems of inferring data to reduce electronic resource consumption are disclosed. In the following description, for purposes of explanation, numerous specific details are set forth in order to provide a thorough understanding of example embodiments. It will be evident, however, to one skilled in the art that the present embodiments may be practiced without these specific details.

The present disclosure provides example embodiments in which employment type data for a profile of a member, or other user, of an online service is inferred. However, it is contemplated that the techniques of the present disclosure can also be used to inter other types of data as well.

Any of the features disclosed herein with respect to the term "member" may also apply to other users of the online service who may not technically be members of the online service, and vice-versa.

In some example embodiments, operations are performed by a machine having a memory and at least one hardware processor, with the operations comprising: detecting a lack of employment type data for a profile of a user on an online service, the employment type data identifying at least one type of employment in which the user is interested; based on the detecting of the lack of employment type data for the profile of the user, generating the employment type data based on an inference model and inference data, the inference data comprising at least one of profile data of the user and a history of the user's interactions with the online service; and performing a function of the online service using the generated employment type data.

In some example embodiments, the operations further comprise: retrieving instances of the inference data for a plurality of user profiles on the online service; for each one of the plurality of user profiles, generating a predicted employment type data using the inference model; for each one of the plurality of user profiles, retrieving a control employment type data; and using a machine learning algorithm to modify the inference model based on a comparison of the corresponding predicted employment type data of the plurality of user profiles with the corresponding control employment type data of the plurality of user profiles.

In some example embodiments, the at least one type of employment comprises at least one of a full-time position and a contract position.

In some example embodiments, the profile data of the user comprises at least one of: an indication of a type of employment position that the user has been employed in within a specified period of time, an indication that the user is seeking a job, one or more keywords in a work experience title, one or more keywords in a work experience description, an indication of two or more different employment positions that the user was employed in within a specified period of time at different organizations with the user being employed in each of the two or more different employments positions for no more than a specified duration, and an indication that the user is registered for a matching service of the online service that matches one or more users of the online service looking for a specific product or service with one or more other users of the online service determined to be a qualified professional for providing the specific product or service.

In some example embodiments, the history of the user's interactions with the online service comprises an indication that the user used the online service to apply for a specified type of employment position within a specified period of time.

In some example embodiments, the performing the function of the online service using the generated employment type data comprises storing, in a database, the generated employment type data in association with the profile of the user.

In some example embodiments, the performing the function of the online service using the generated employment type data comprises searching the online service for profiles of users that satisfy search criteria including at least an employment type criteria, the searching comprising determining whether the generated employment type data of the user satisfies the employment type criteria of the search criteria.

In some example embodiments, the operations further comprise receiving a search request including the search criteria, wherein the generating of the employment type data and the searching of the online service are performed based on the receiving of the search request.

In some example embodiments, the operations further comprise: transmitting a verification request to a computing device of the user, the verification request comprising the generated employment type data and a request for feedback regarding accuracy of the generated employment type data; receiving, from the computing device, feedback regarding the accuracy of the generated employment type data; and modifying the inference model based on the received feedback.

In some example embodiments, the online service comprises a social networking service.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
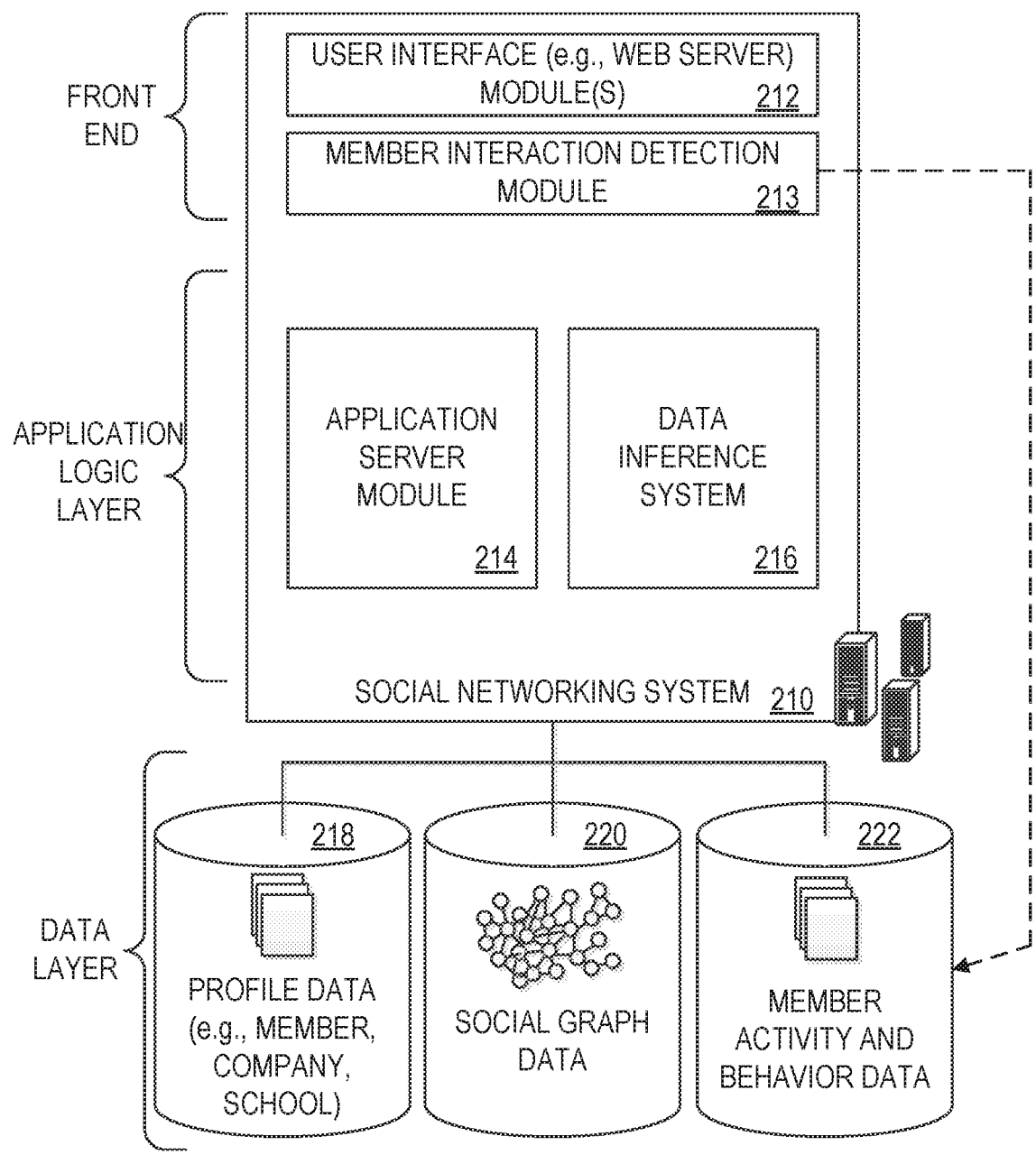
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as an data inference system 216, for use in social networking system 210, consistent with some embodiments of the present disclosure. In some embodiments, the data inference system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the data inference system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to inter or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the data inference system 216.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the data inference system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
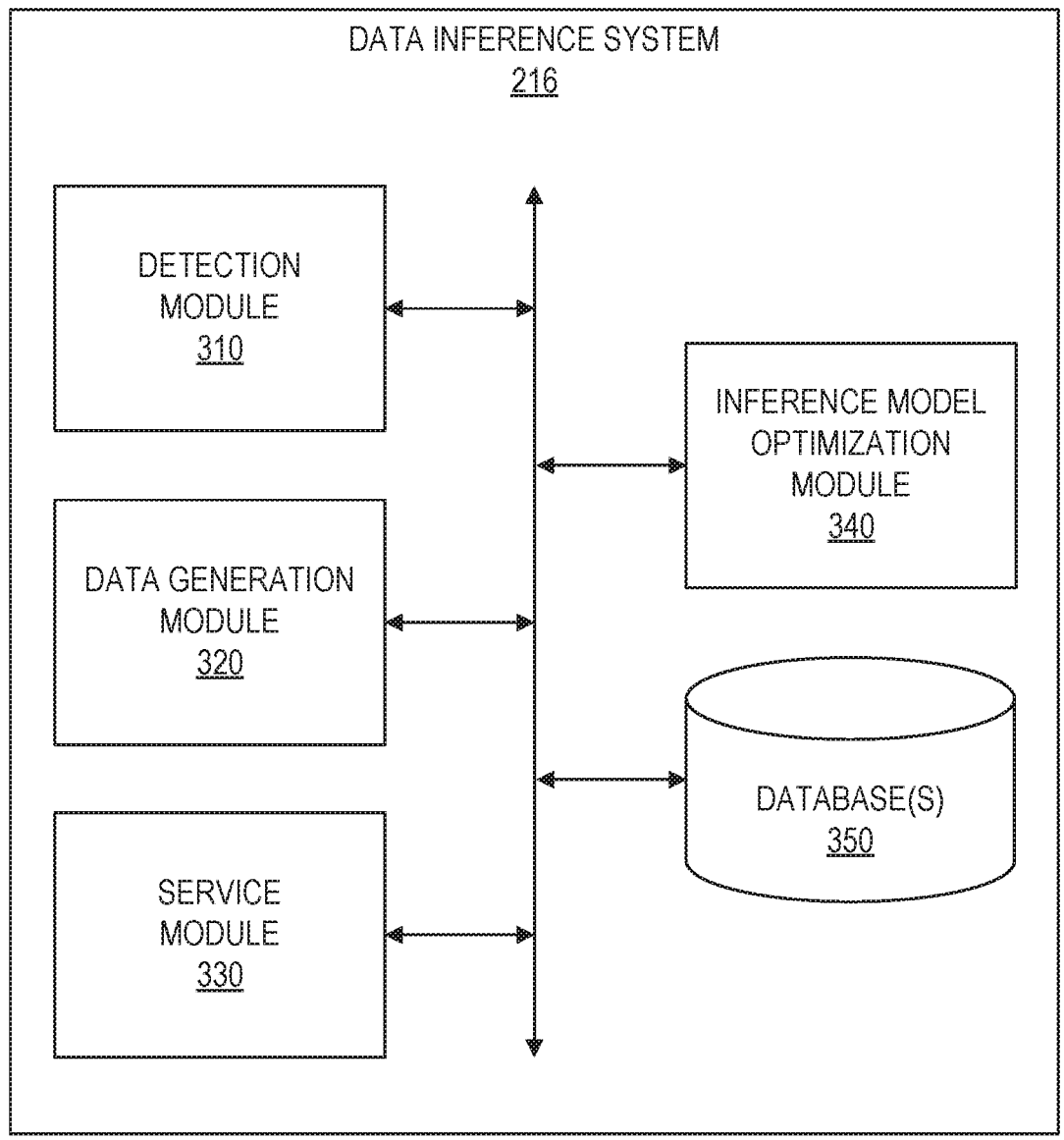
FIG. 3 is a block diagram illustrating components of a data inference system, in accordance with an example embodiment.

FIG. 3 is a block diagram illustrating components of the data inference system 216, in accordance with an example embodiment. In some embodiments, the data inference system 216 comprises any combination of one or more of a detection module 310, a data generation module 320, a service module 330, an inference model optimization module 340, and one or more database(s) 350. The detection module 310, the data generation module 320, the service module 330, the inference model optimization module 340, and the database(s) 350 can reside on a machine having a memory and at least one processor (not shown). In some embodiments, the detection module 310, the data generation module 320, the service module 330, the inference model optimization module 340, and the database(s) 350 can be incorporated into the application server(s) 118 in FIG. 1. In some example embodiments, the database(s) 350 is incorporated into database(s) 126 in FIG. 1 and can include any combination of one or more of databases 218, 220, and 222 in FIG. 2. However, it is contemplated that other configurations of the modules 310, 320, 330, and 340, as well as the database(s) 350, are also within the scope of the present disclosure.

In some example embodiments, one or more of the detection module 310, the data generation module 320, the service module 330, and the inference model optimization module 340 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the detection module 310, the data generation module 320, the service module 330, and the inference model optimization module 340 is configured to receive user input. For example, one or more of the modules 310, 320, 330, and 340 can present one or more GUI elements (e.g., drop-down menu, selectable buttons, text field) with which a user can submit input.

In some example embodiments, one or more of the modules 310, 320, 330 and 340 is configured to perform various communication functions to facilitate the functionality described herein, such as by communicating with the social networking system 210 via the network 104 using a wired or wireless connection. Any combination of one or more of the modules 310, 320, 330, and 340 may also provide various web services or functions, such as retrieving information from the third party servers 130 and the social networking system 210. Information retrieved by the any of the modules 310, 320, 330, and 340 may include profile data corresponding to users and members of the social networking service of the social networking system 210.

Additionally, any combination of one or more of the modules 310, 320, 330, and 340 can provide various data functionality, such as exchanging information with database(s) 350 or servers. For example, any of the modules 310, 320, 330, and 340 can access member profiles that include profile data from the database(s) 350, as well as extract attributes and/or characteristics from the profile data of member profiles (e.g., profile data from database 218). Furthermore, the one or more of the modules 310, 320, 330, and 340 can access social graph data (e.g., social graph data from database 220) and member activity and behavior data e.g., member activity and behavior data from database 222) from database(s) 350, as well as exchange information with third party servers 130, client machines 110, 112, and other sources of information.

In some example embodiments, the detection module 310 is configured to detect a lack of employment type data for a profile of a member on an online service. The online service may comprise a social networking service, such as the social networking service of FIG. 2. However, it is contemplated that other types of online services are also within the scope of the present disclosure. For example, external search engines (e.g., a search engine separate and independent from any search engine of the social networking service on which the data inference system is employed 216) may benefit from having access to employment type data that otherwise would be missing or inaccurate, such as by making the search results of those external search engines more accurate, relevant, and complete.

The employment type data identifies at least one type of employment in which the member is interested. Examples of types of employments include, but are not limited to, full-time, part-time, internship, remote, freelance, and contract. It is contemplated that other types of employment are also within the scope of the present disclosure. In some example embodiments, the detection module 310 is configured to detect a lack of employment type data identifying at least one of a full-time position and a contract position as a type of employment in which the member is interested. However, other configurations are also within the scope of the present disclosure.

FIG. 4 illustrates a graphical user interface (GUI) 400 displaying options for profile data of a member of an online service, in accordance with an example embodiment. As seen in FIG. 4, the GUI 400 may be configured to enable a user to select or otherwise provide options for career interests. In FIG. 4, the GUI 400 displays user interface elements configured to be used by a member to provide input regarding career interests.

For example, the GUI 400 displays a selectable user interface element 410 that the member may select to input an indication of a job title (e.g., "software engineer") in which the member is interested for career purposes. In response to the selection of the selectable user interface element 410, the GUI 400 may prompt the user to select one or more job titles from a list of job titles or to enter one or more job titles into a text field.

The GUI 400 also displays a selectable user interface element 420 that the member may select to input an indication of one or more locations (e.g., Cupertino, Calif.) where the member would like to work. In response to the selection of the selectable user interface element 410, the GUI may prompt the user to select one or more locations from a list of locations or to enter one or more locations into a text field.

The GUI 400 further displays one or more selectable user interface elements 430 (e.g., checkboxes) that the member may select to input an indication of types of jobs. In some example embodiments, the types of jobs correspond to a level of the amount of work, a level of the time of work, or a level of the relationship that the member is seeking with a potential job or employer. Examples of these job types include, but are not limited to, full-time, part-time, internship, remote, freelance, and contract. However, is contemplated that other types of jobs are also within the scope of the present disclosure.

The GUI 400 also displays a selectable user interface element 440 that the member may select to input an indication of an industry (e.g., "Finance") in which the member is interested for career purposes. In response to the selection of the selectable user interface element 440, the GUI 400 may prompt the user to select one or more industries from a list of industries or to enter one or more industries into a text field.

The GUI 400 further displays a selectable user interface element 450 that the member may select to input an indication of a size of an organization (e.g., "1 to 10,000 employees") for which the member is interested in working. In response to the selection of the selectable user interface element 450, the GUI 400 may prompt the user to select one or more organization sizes from a list of organization sizes or to enter one or more organization sizes into a text field.

A member may save the configuration of input regarding career interests (e.g., types of jobs) via the GUI 400, and thereby store the input in association with the profile of the member, such as in the form of profile data. However, in some cases, such input may be lacking. For example, in some cases, a member may not have provided any input regarding what types of jobs he or she is interested in.

It is contemplated that the detection module 310 may detect the lack of employment type data for a profile in a variety of ways. In some example embodiments, the detection module 310 periodically scans all of the profiles on the online service to find any profiles having a corresponding field for employment type data that is lacking any data (e.g., the field is blank) or that is lacking any appropriate data from which an employment type can be determined (e.g., the field comprises a meaningless set of one or more characters that do not indicate a size, such as "3X&m3y").

In some example embodiments, the detection module 310 detects that a profile is lacking employment type data when that profile is being used or is going to be used in a function of the online service for which the employment type data is necessary or otherwise relevant. For example, as a search for profiles satisfying a particular criteria is performed, the detection module 310 may inspect each profile to determine whether or not is comprises sufficient employment type data.

In some example embodiments, the data generation module 320 is configured to generate the employment type data for a member based on an inference model and inference data in response to, or otherwise based on, the detection of the lack of employment type data for the profile of the member. The data generation module 320 may retrieve inference data from database(s) 350 (e.g., any combination of one or more of databases 218, 220, and 222), or from some other source, and input the retrieved inference data into the inference model, which may then generate and output employment type data. The data generation module 320 may then store the generated employment type data in database(s) 350 in association with the profile of the member in profile database 218 in FIG. 2).

It is contemplated that the inference data used by the data generation module 320 to generate the employment type data may comprise a variety of different types of data. In some example embodiments, the inference data comprises at least one of profile data of the member and a history of the member's interactions with the online service. However, it is contemplated that other types of inference data may be used by the data generation module 320 to generate the employment type data.

In some example embodiments, the profile data used as the inference data comprises at least one of an indication of a type of employment position that the member has been employed in within a specified period of time e.g., an indication that the member has held a position in the last five years that is not an internship and is not a contract job), an indication that the member is seeking a job (e.g., member's profile identifies member as a job seeker), one or more keywords in a work experience title (e.g., member's profile has keywords in work titles that suggest a contracting role, such as "contractor" or "temporary"), one or more keywords in a work experience description (e.g., member's profile has keywords in work experience description that suggest a contracting role, such as "contractor" or "temporary"), an indication of two or more different employment positions that the member was employed in within a specified period of time at different organizations with the member being employed in each of the two or more different employments positions for no more than a specified duration e.g., in the last three years, the member has had two or more positions at different companies, and those employment experiences lasted twelve months or less in durations and an indication that the member is registered for a matching service of the online service that matches one or more members of the online service looking for a specific product or service with one or more other members of the online service determined to be a qualified professional for providing the specific product or service (e.g., member has signed up and registered for LinkedIn's ProFinder service). It is contemplated that other types of profile data are also within the scope of the present disclosure and may be used as the inference data.

In some example embodiments, the history of the member's interactions with the online service used as the inference data comprises an indication that the member used the online service to apply for a specified type of employment position within a specified period of time (e.g., member has applied for a full-time job position using the online service sometime within the last two years). It is contemplated that other types of member interactions with the online service are also within the scope of the present disclosure and may be used as the inference data.

In some example embodiments, the inference model comprises an algorithm that processes the inference data to generate employment type data for a member. In some example, embodiments, the inference model comprises a corresponding set of one or more rules for each job type. The data generation module 320 may compare the inference data against these rules to determine which employment type data to assign to the member.

For example, in some example embodiments, the data generation module 320 identifies a member as being interested in full-time positions if any of the following conditions is indicated by the inference data for the member:
 a) the member has had a position in the last five years that is not an internship and that is not a contract position;
 b) the member has applied to a full-time job positon using the online service sometime in the last two years; and
 c) the member is identified as a job seeker in his or her profile.

As another example, in some example embodiments, the data generation module 320 identifies a member as being interested in contract positions if any of the following conditions is indicated by the inference data for the member:
 a) the member's profile has keywords in work titles or summaries/descriptions that suggest a contracting role (e.g., "contractor," "temporary");
 b) in the last three years, the member has had two or more positions at different companies that were twelve months or less in duration;
 c) the member has applied to a contract job using the online service sometime in the last two years; and
 d) the member is reregistered for a particular matching service of the online service that matches one or more members of the online service looking for a specific product or service with one or more other members of the online service determined to be a qualified professional for providing the specific product or service.

It is contemplated that other configurations of the inference model are also within the scope of the present disclosure. In some example embodiments, the conditions for determining that a member is interested in a particular job type may be modified over time, such as by adding conditions, removing conditions, and changing the number of conditions that are required for assigning a particular job type to a member. For example, instead of the data generation module 320 identifying a member as being interested in contract positions if any of the above conditions is indicated by the inference data for the member, the data generation module 320 may identify a member as being interested in contract positions is at least two of the above conditions are indicated by the inference data for the member. As will be discussed in further detail later below, the inference model may be modified over time.

In some example embodiments, the detection module 310 is configured to determine that employment type data for a member of an online service is potentially incorrect, even though a valid employment type data exists for the profile of the member. For example, the current employment type data for the profile of the member may be outdated and, therefore, not reflect the current interest(s) of the member. In some example embodiments, the detection module 310 is configured to detect that the current employment type data for the member is outdated based on an analysis of date (or other time data) of the last time the current employment type data was set or updated. The detection module 310 may signal the data generation module 320 to generate employment type data for the member as discussed above in response to, or otherwise based on, a determination that the amount of time since the current employment type data for the member was last updated exceeds, or otherwise satisfies, a predetermined threshold amount of time (e.g., if it has been more than 1 year since the current employment type data for the profile of the member was updated).

In some example embodiments, the inference model optimization module 340 is configured to use one or more machine learning algorithms to modify the inference model. In this way, the inference model optimization module 340 can determine the best attributes to use in the determination of the employment type data for a profile of a member, as well as the best way to use those attributes (e.g., how to weight the attributes in the inference model).

In some example embodiments, the inference model optimization module 340 is configured to retrieve instances of inference data for a plurality of members of the online service, and, for each one of the members, generate a predicted employment type data using the inference model. In some example embodiments, the inference model optimization module 340 is further configured to, for each one of the members, retrieve a control employment type data, and use a machine learning algorithm to modify the inference model based on a comparison of the corresponding predicted employment type data of the members with the corresponding control employment type data of the members. The control employment type data comprises employment type data that is determined to be accurate for the member and therefore serves as a reference for determining the accuracy level of the predicted employment type data, which is consequently used in determining the accuracy level of the inference model used to generate the predicted employment type data. Through this optimization process, the inference model optimization module 340 can increase the accuracy of the inference model, resulting in more accurate employment type data generated by the data generation module 320.

In some example embodiments, the service module 330 is configured to perform one or more functions of the online service using the employment type data generated by the data generation module 320. One example of performing a function of the online service using the employment type data generated by the data generation module 320 is storing, in a database, the generated employment type data in association with the profile of the corresponding member. As a result of this storing of the generated employment type data, such generated employment type data may become available for display on a profile page of the member, such as in in the GUI 400 in FIG. 4. For example, instead of no user interface elements 430 representing job type options being selected, as might otherwise be the case without the data inference features disclosed herein, one or more of the user interface elements 430 representing job type options may be automatically selected for the member by the service module 330 based on the employment type data generated by the data generation module 320. Other features and functions of the online service can also access the generated employment type data stored in the database.

Another example of performing a function of the online service using the employment type data generated by the data generation module 320 is performing a search of profiles using a search criteria that includes an employment type criteria, such as when a recruiter is performing a search of members of the online service to find potential candidates for a particular job position. In some example embodiments, the detection module 310 detects the lack of employment type data and the data generation module 320 generates the employment type data prior to a search request being serviced using the generated employment type data. However, in other example embodiments, a search request comprising the search criteria is received, and then the detection module 310 detects the lack of employment type data and the data generation module 320 generates the employment type data, which is then used in servicing the search request, such as determining whether the member for which the employment type data is generated satisfies the employment type criteria of the search request. In this respect, the data inference system 216 can generate employment type data for a member that lacks such employment type data in his or her profile in real-time, rather than relying on a periodic maintenance process. As a result, the generated employment type data may be more up-to-date, and therefore more accurate, and the computational expense involved with performing frequent periodic maintenance operations that involve analyzing profiles can be significantly reduced.

Figure 5:
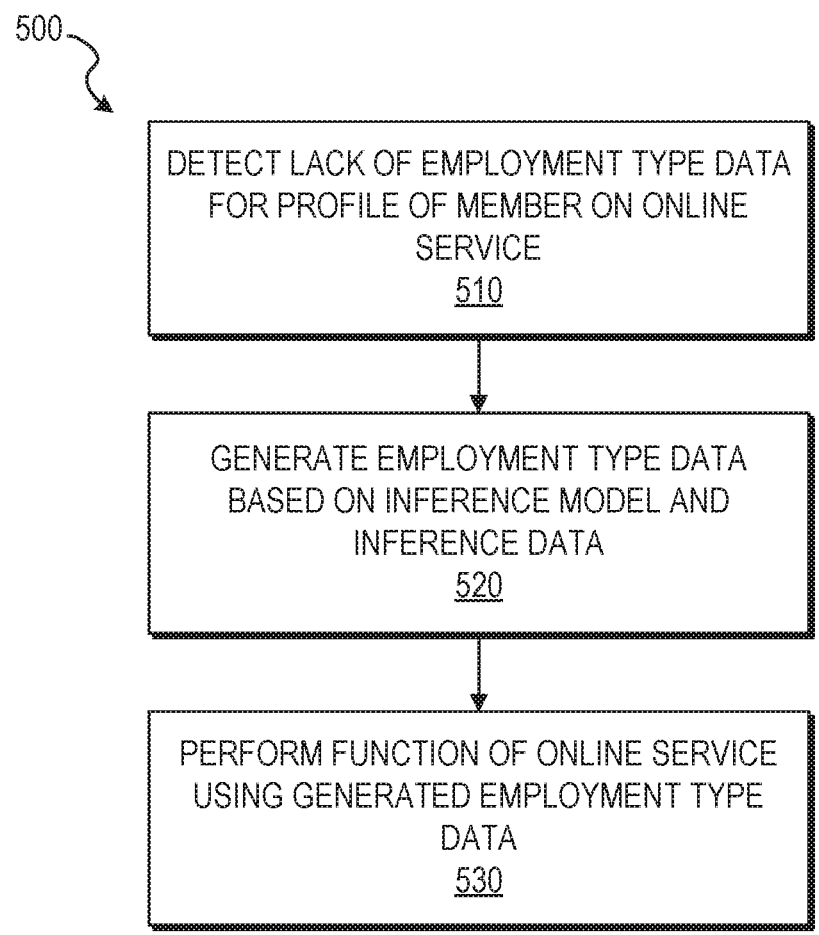
FIG. 5 is a flowchart illustrating a method of inferring data, in accordance with an example embodiment.

FIG. 5 is a flowchart illustrating a method 500 of inferring data, in accordance with an example embodiment. Method 500 can be performed by processing logic that can comprise hardware (e.g., circuitry, dedicated logic, programmable logic, microcode, etc.), software (e.g., instructions run on a processing device), or a combination thereof. In one implementation, the method 500 is performed by the data inference system 216 of FIGS. 2-3, or any combination of one or more of its modules, as described above.

At operation 510, the data inference system 216 detects a lack of employment type data for a profile of a member on an online service. In some example embodiments, the employment type data identifies at least one type of employment in which the member is interested. In some example embodiments, the at least one type of employment comprises at least one of a full-time position and a contract position. In some example embodiments, the online service comprises a social networking service.

At operation 520, based on the detecting of the lack of employment type data for the profile of the member, the data inference system 216 generates the employment type data based on an inference model and inference data. In some example embodiments, the inference data comprises at least one of profile data of the member and a history of the member's interactions with the online service. In some example embodiments, the profile data of the member comprises at least one of: an indication of a type of employment position that the member has been employed in within a specified period of time, an indication that the member is seeking a job, one or more keywords in a work experience title, one or more keywords in a work experience description, an indication of two or more different employment positions that the member was employed in within a specified period of time at different organizations with the member being employed in each of the two or more different employments positions for no more than a specified duration, and an indication that the member is registered for a matching service of the online service that matches one or more members of the online service looking for a specific product or service with one or more other members of the online service determined to be a qualified professional for providing the specific product or service. In some example embodiments, the history of the member's interactions with the online service comprises an indication that the member used the online service to apply for a specified type of employment position within a specified period of time.

At operation 530, the data inference system 216 performs a function of the online service using the generated employment type data. In some example embodiments, the performing the function of the online service using the generated employment type data comprises storing, in a database, the generated employment type data in association with the profile of the member. In some example embodiments, the performing the function of the online service using the generated employment type data comprises searching the online service for profiles of members that satisfy search criteria including at least an employment type criteria, the searching comprising determining whether the generated employment type data of the member satisfies the employment type criteria of the search criteria.

It is contemplated that any of the other features described within the present disclosure can be incorporated into method 500.

Figure 6:
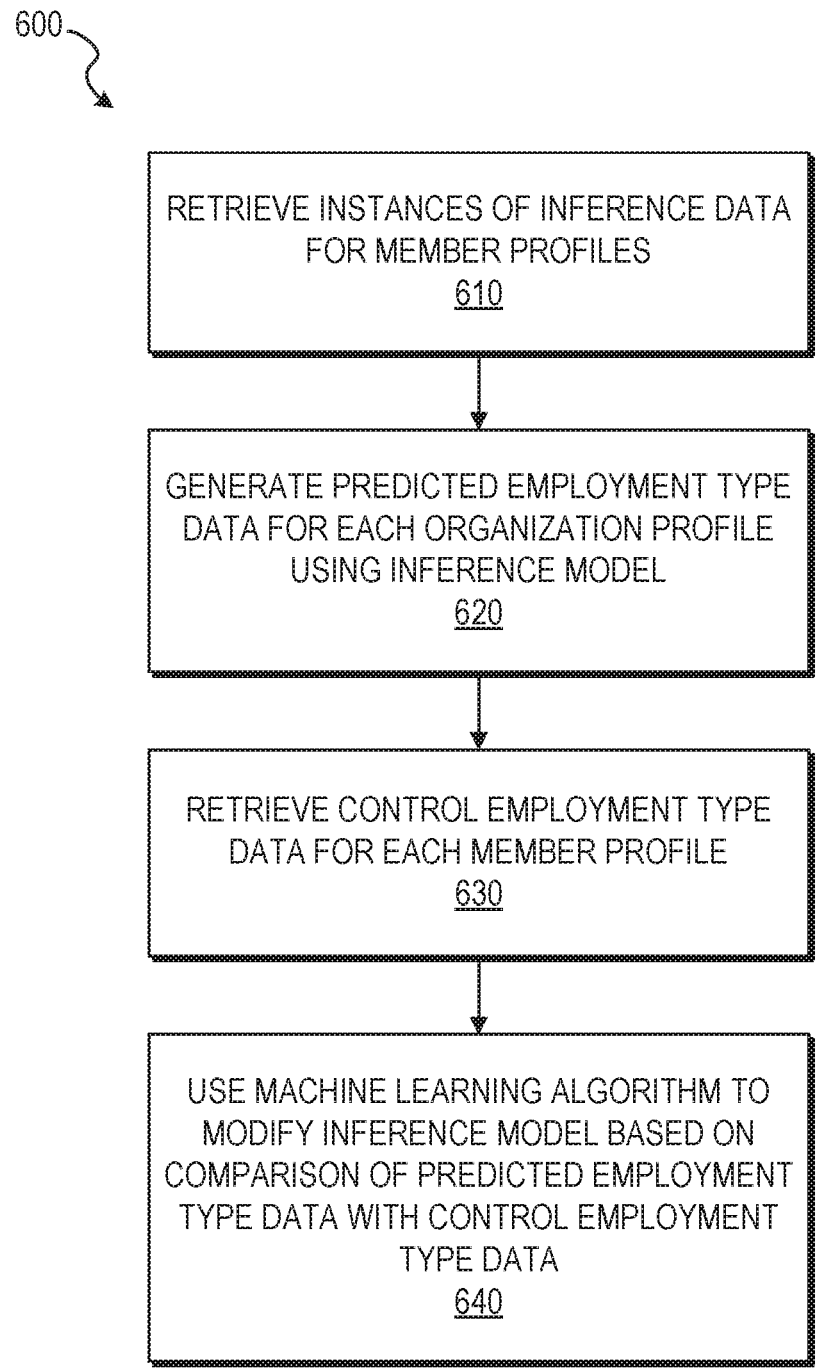
FIG. 6 is a flowchart illustrating a method of modifying an inference model, in accordance with an example embodiment.

FIG. 6 is a flowchart illustrating a method 600 of modifying an inference model, in accordance with an example embodiment. Method 600 can be performed by processing logic that can comprise hardware (e.g., circuitry, dedicated logic, programmable logic, microcode, etc.), software (e.g., instructions run on a processing device), or a combination thereof. In one implementation, the method 600 is performed by the data inference system 216 of FIGS. 2-3, or any combination of one or more of its modules, as described above.

At operation 610, the data inference system 216 retrieves instances of the inference data for a plurality of member profiles on the online service. The data inference system 216 may retrieve the instances of inference data from database(s) 350 (e.g., any combination of one or more of databases 218, 220, and 222), or from some other source. It is contemplated that the inference data may comprise a variety of different types of data. In some example embodiments, the inference data comprises at least one of profile data of the member and a history of the member's interactions with the online service. However, it is contemplated that other types of inference data may be used.

At operation 620, the data inference system 216, for each one of the plurality of member profiles, generates a predicted employment type data using the inference model. The data inference system 216 may input the retrieved inference data into the inference model, which may then generate and output the predicted employment type data.

At operation 630, the data inference system 216, for each one of the plurality of member profiles, retrieves a control employment type data. The control employment type data comprises employment type data that is determined to be accurate for the member and therefore serves as a reference for determining the accuracy level of the predicted employment type data.

At operation 640, the data inference system 216 uses a machine learning algorithm to modify the inference model based on a comparison of the corresponding predicted employment type data of the plurality of member profiles with the corresponding control employment type data of the plurality of member profiles. In some example embodiments, using a machine learning algorithm to modify the inference model based on the comparison comprises determining the best attributes to use in the determination of the employment type data for a profile of a member, as well as the best way to use those attributes. For example, the modification of the inference model may comprise adjusting the corresponding weights of the attributes in the inference model.

It is contemplated that any of the other features described within the present disclosure can be incorporated into method 600.

Figure 7:
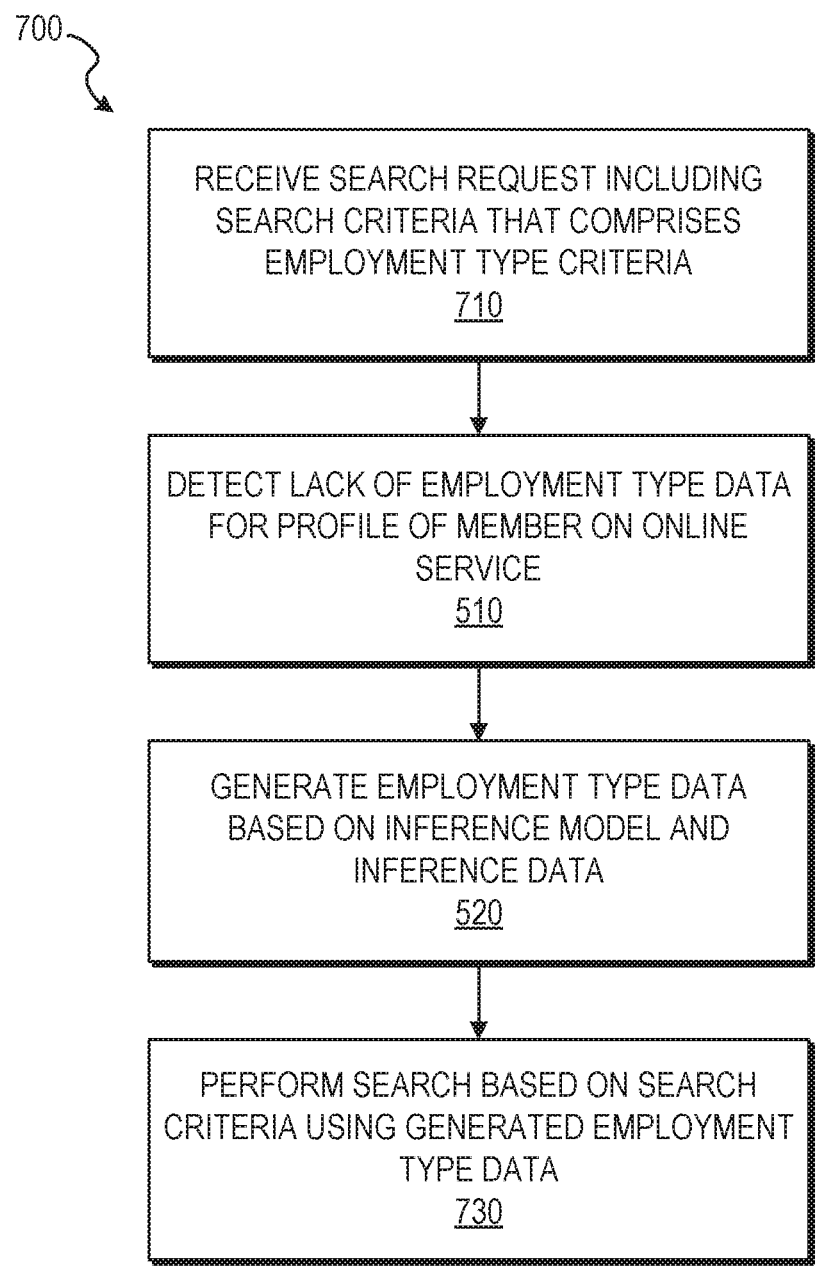
FIG. 7 is a flowchart illustrating a method of performing a function of an online service using generated data, in accordance with an example embodiment.

FIG. 7 is a flowchart illustrating a method 700 of performing a function of an online service using generated data, in accordance with an example embodiment. Method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the data inference system 216 of FIGS. 2-3, or any combination of one or more of its modules, as described above.

At operation 710, the data inference system 216 receives a search request including search criteria that includes at least an employment type data criteria. The method 700 then proceeds to operation 510, where the data inference system 216 detects a lack of employment type data for a profile of member on an online service. At operation 520, based on the detecting of the lack of employment type data for the profile of the member, the data inference system 216 generates the employment type data based on an inference model and inference data. At operation 730, the data inference system 216 performs a search based on the search criteria using the generated employment type data. The data inference system 216 searches the online service for profiles of members that satisfy the search criteria, including the employment type data criteria. The performance of the search includes determining whether the generated employment type data of members satisfies the employment type data criteria of the search criteria.

It is contemplated that any of the other features described within the present disclosure can be incorporated into method 700.

Referring back to FIG. 3, in some example embodiments, the inference model optimization module 340 is further configured to modify the inference model based on feedback from a user regarding the accuracy of employment type data generated by the data generation module 320. For example, the inference model optimization module 340 may transmit a verification request to a computing device of a member of the online service for whom employment type data has been generated by the data generation module 320.

FIG. 8 illustrates a GUI 800 displaying a verification request, in accordance with an example embodiment. The verification request may be transmitted to the user via e-mail, text message, a web page of the online service, push notification, and/or within a mobile application of the online service. Other ways of presenting the verification request to the user are also within the scope of the present disclosure.

In some example embodiments, the verification request comprises employment type data 810 generated by the data generation module 320 (e.g., "FULL-TIME" in FIG. 8) and a request 820 for feedback regarding accuracy of the generated employment type data 810 (e.g., "IS THIS INFERENCE CORRECT?" in FIG. 8). The verification request may comprise one or more graphic user interface elements configured to be used by a recipient of the verification request to provide feedback regarding the accuracy of the generated employment type data 810. For example, the verification request may comprise selectable radio buttons 822 and 824 configured to enable the recipient to indicate whether or not the generated employment type data 810 is correct, as well as selectable checkboxes 830 configured to indicate the correct employment type data that should be used by the online service and the data inference system 216 instead of the generated employment type data 810. For example, if the member is not interested in full-time employment positions, but rather is interested in part-time employment positions, then the member may select radio button 822 and the checkbox 830 corresponding to part-time employment positions. A selectable "SUBMIT" button 840 may be provided in the verification request to enable the user to submit the feedback regarding the accuracy of the generated employment type data 810.

In some example embodiments, the inference model optimization module 340 is further configured to receive the feedback regarding the accuracy of the generated employment type data from the computing device of the member, and then modify the inference model based on the received feedback. For example, the degree of error between the generated employment type data and the correct employment type data indicated in feedback from the member can be used by the inference model optimization module 340 to analyze the accuracy of the inference model. The inference model optimization module 340 may accumulate feedback from several different users regarding several different generated employment type data for different members. The analysis of such accumulated feedback may be used by the inference model optimization module 340 to change the inference data used in the inference model or the way in which the inference data are used (e.g., the weighting of the inference data).

Figure 9:
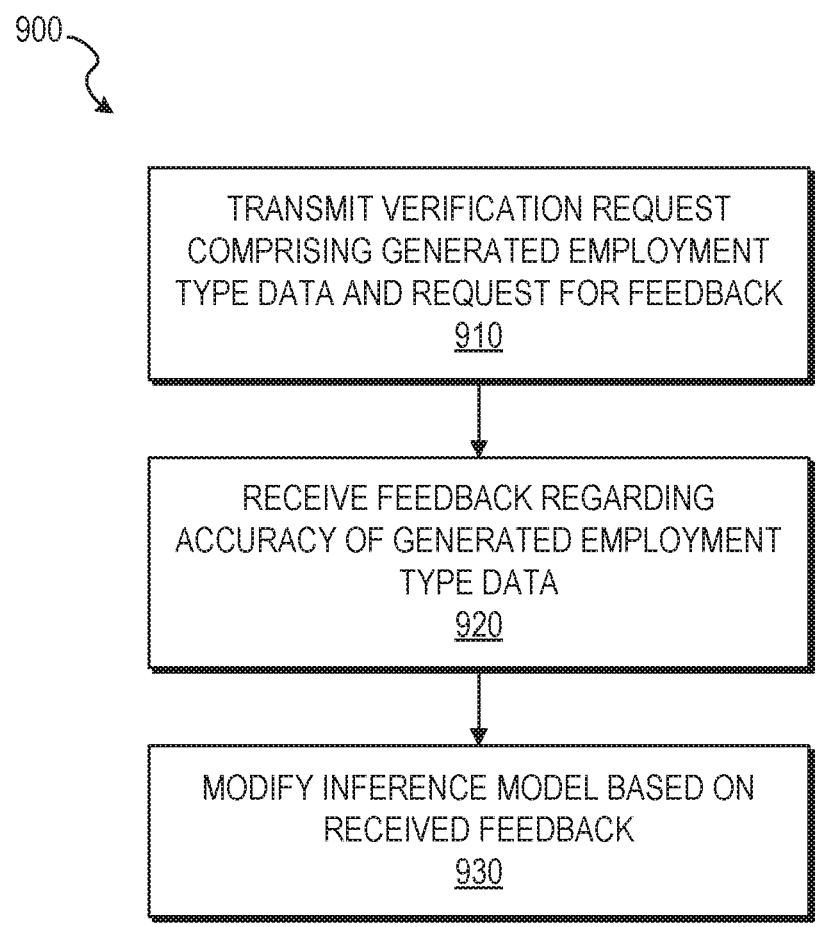
FIG. 9 is a flowchart illustrating a method of modifying an inference model, in accordance with an example embodiment.

FIG. 9 is a flowchart illustrating a method 900 of modifying an inference model, in accordance with an example embodiment. Method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by the data inference system 216 of FIGS. 2-3, or any combination of one or more of its modules, as described above.

At operation 910, the data inference system 216 transmits a verification request to a computing device of a member of the online service. In some example embodiments, the verification request comprises the generated employment type data and a request for feedback regarding accuracy of the generated employment type data. At operation 920, the data inference system 216 receives, from the computing device, feedback regarding the accuracy of the generated employment type data. At operation 930, the data inference system 216 modifies the inference model based on the received feedback.

It is contemplated that any of the other features described within the present disclosure can be incorporated into method 900.

Example Mobile Device

Figure 10:
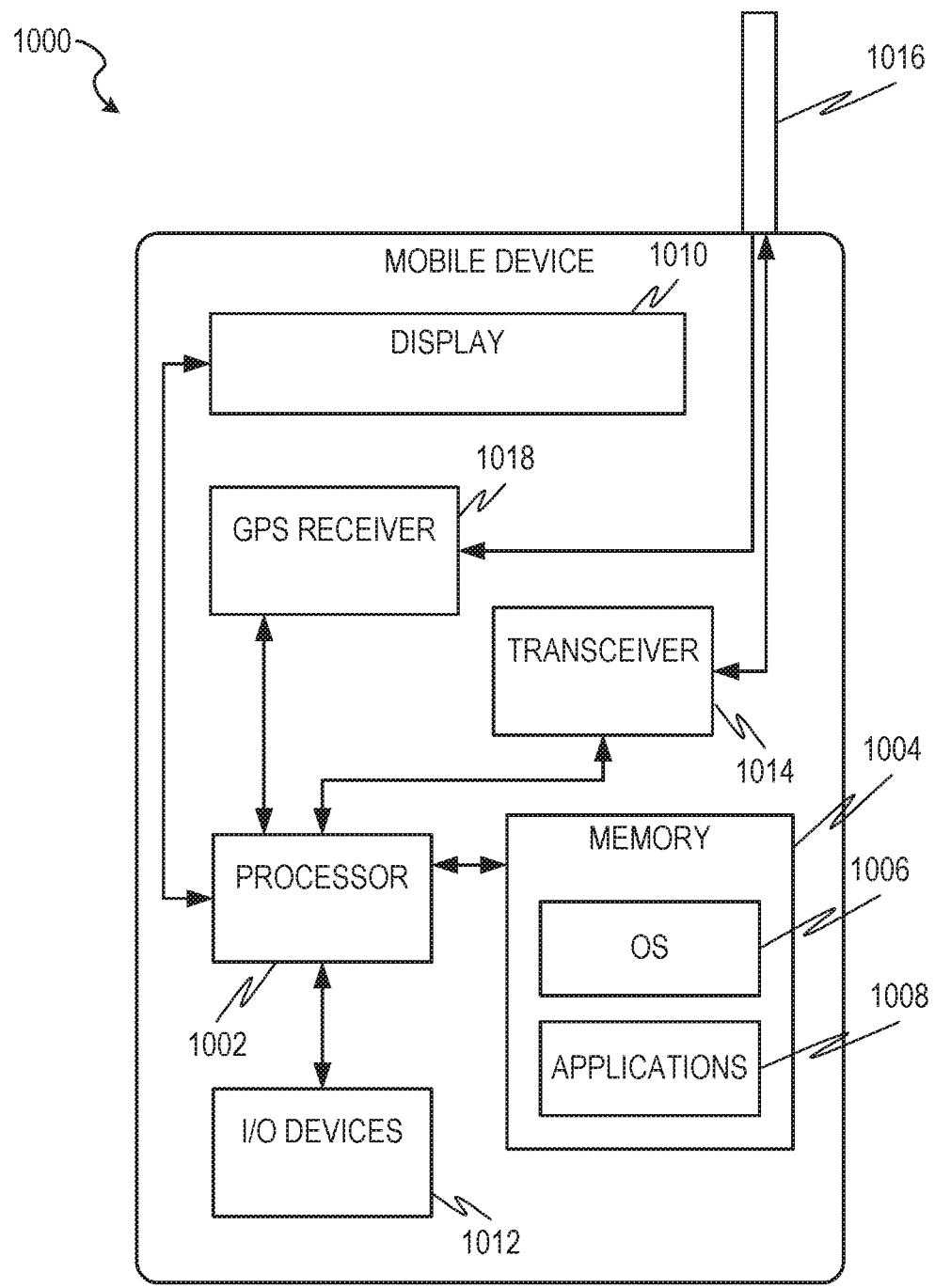
FIG. 10 is a block diagram illustrating a mobile device, in accordance with some example embodiments.

FIG. 10 is a block diagram illustrating a mobile device 1000, according to an example embodiment. The mobile device 1000 can include a processor 1002. The processor 1002 can be any of a variety of different types of commercially available processors suitable for mobile devices 1000 (for example, an XScale architecture microprocessor, a Microprocessor without interlocked Pipeline Stages (MIPS) architecture processor, or another type of processor). A memory 1004, such as a random access memory (RAM), a Flash memory, or other type of memory, is typically accessible to the processor 1002. The memory 1004 can be adapted to store an operating system (OS) 1006, as well as application programs 1008, such as a mobile location-enabled application that can provide location-based services (LBSs) to a user. The processor 1002 can be coupled, either directly or via appropriate intermediary hardware, to a display 1010 and to one or more input/output (I/O) devices 1012, such as a keypad, a touch panel sensor, a microphone, and the like. Similarly, in some embodiments, the processor 1002 can be coupled to a transceiver 1014 that interfaces with an antenna 1016. The transceiver 1014 can be configured to both transmit and receive cellular network signals, wireless data signals, or other types of signals via the antenna 1016, depending on the nature of the mobile device 1000. Further, in some configurations, a GPS receiver 1018 can also make use of the antenna 1016 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
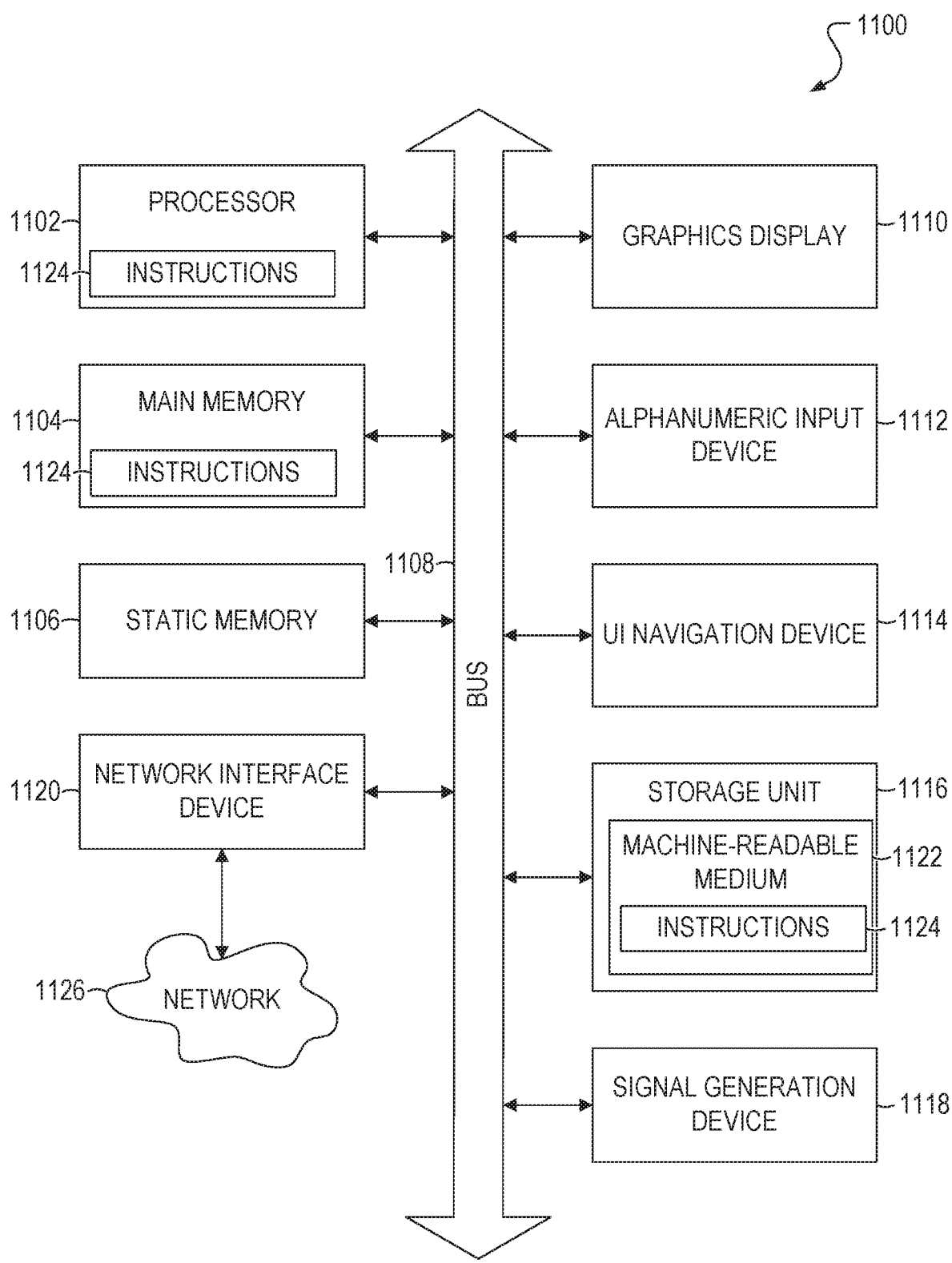
FIG. 11 is a block diagram of an example computer system on which methodologies described herein may be executed, in accordance with an example embodiment.

FIG. 11 is a block diagram of an example computer system 1100 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a graphics display unit 1110 (e.g., a liquid crystal display (LCD) or a cathode ray tube (CRT)). The computer system 1100 also includes an alphanumeric input device 111 (e.g., a keyboard or a touch-sensitive display screen), a user interface (UI) navigation device 1114 (e.g., a mouse), a storage unit 1116, a signal generation device 1118 (e.g., a speaker) and a network interface device 1120.

Machine-Readable Medium

The storage unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding or carrying instructions (e.g., instructions 1124) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   detecting, by at least one hardware processor, a lack of employment type data for a profile of a user on an online service, the employment type data identifying at least one type of employment;
   based on the detecting of the lack of employment type data for the profile of the user, generating, by the at least one hardware processor, the employment type data based on an inference model and inference data, the inference data comprising at least one of profile data of the user or a history of the user's interactions with the online service;
   performing, by the at least one hardware processor, a function of the online service using the generated employment type data;
   retrieving, by the at least one hardware processor, instances of the inference data for a plurality of user profiles on the online service;
   for each one of the plurality of user profiles, generating, by the at least one hardware processor, a predicted employment type data using the inference model;
   for each one of the plurality of user profiles, retrieving, by the at least one hardware processor, a control employment type data; and
   using, by the at least one hardware processor, a machine learning algorithm to modify the inference model based on a comparison of the corresponding predicted employment type data of the plurality of user profiles with the corresponding control employment type data of the plurality of user profiles.

2. The computer-implemented method of claim 1, wherein the at least one type of employment comprises at least one of a full-time position or a contract position.

3. The computer-implemented method of claim 1, wherein the profile data of the user comprises at least one of: an indication of a type of employment position that the user has been employed in within a specified period of time, an indication that the user is seeking a job, one or more keywords in a work experience title, one or more keywords in a work experience description, an indication of two or more different employment positions that the user was employed in within a specified period of time at different organizations with the user being employed in each of the two or more different employments positions for no more than a specified duration, or an indication that the user is registered for a matching service of the online service that matches one or more users of the online service looking for a specific product or service with one or more other users of the online service determined to be a qualified professional for providing the specific product or service.

4. The computer-implemented method of claim 1, wherein the history of the user's interactions with the online service comprises an indication that the user used the online service to apply for a specified type of employment position within a specified period of time.

5. The computer-implemented method of claim 1, wherein the performing the function of the online service using the generated employment type data comprises storing, in a database, the generated employment type data in association with the profile of the user.

6. The computer-implemented method of claim 1, wherein the performing the function of the online service using the generated employment type data comprises searching the online service for profiles of users that satisfy search criteria including at least an employment type criteria, the searching comprising determining whether the generated employment type data of the user satisfies the employment type criteria of the search criteria.

7. The computer-implemented method of claim 6, further comprising receiving a search request including the search criteria, wherein the generating of the employment type data and the searching of the online service are performed based on the receiving of the search request.

8. The computer-implemented method of claim 1, further comprising:
   transmitting a verification request to a computing device of the user, the verification request comprising the generated employment type data and a request for feedback regarding accuracy of the generated employment type data;
   receiving, from the computing device, feedback regarding the accuracy of the generated employment type data; and
   modifying the inference model based on the received feedback.

9. The computer-implemented method of claim 1, wherein the inference model is configured to generate the employment type data based on a set of conditions being indicated by the inference data, and the machine learning algorithm is configured to modify the inference model by:
   adding one or more conditions to the set of conditions;
   removing one or more conditions from the set of conditions; and
   changing a number of conditions in the set of conditions that are required to be indicated by the inference data in order for the inference model to generate the employment type data.

10. A system comprising:
    at least one hardware processor; and
    a non-transitory machine-readable medium embodying a set of instructions that, when executed by the at least one processor, cause the at least one processor to perform operations, the operations comprising:
      detecting a lack of employment type data for a profile of a user on an online service, the employment type data identifying at least one type of employment;
      based on the detecting of the lack of employment type data for the profile of the user, generating the employment type data based on an inference model and inference data, the inference data comprising at least one of profile data of the user or a history of the user's interactions with the online service; and
      performing a function of the online service using the generated employment type data.

11. The system of claim 10, wherein the operations further comprise:
    retrieving instances of the inference data for a plurality of user profiles on the online service;
    for each one of the plurality of user profiles, generating a predicted employment type data using the inference model;
    for each one of the plurality of user profiles, retrieving a control employment type data; and
    using a machine learning algorithm to modify the inference model based on a comparison of the corresponding predicted employment type data of the plurality of user profiles with the corresponding control employment type data of the plurality of user profiles.

12. The system of claim 10, wherein the at least one type of employment comprises at least one of a full-time position and or a contract position.

13. The system of claim 10, wherein the profile data of the user comprises at least one of: an indication of a type of employment position that the user has been employed in within a specified period of time, an indication that the user is seeking a job, one or more keywords in a work experience title, one or more keywords in a work experience description, an indication of two or more different employment positions that the user was employed in within a specified period of time at different organizations with the user being employed in each of the two or more different employments positions for no more than a specified duration, or an indication that the user is registered for a matching service of the online service that matches one or more users of the online service looking for a specific product or service with one or more other users of the online service determined to be a qualified professional for providing the specific product or service.

14. The system of claim 10, wherein the history of the user's interactions with the online service comprises an indication that the user used the online service to apply for a specified type of employment position within a specified period of time.

15. The system of claim 10, wherein the performing the function of the online service using the generated employment type data comprises storing, in a database, the generated employment type data in association with the profile of the user.

16. The system of claim 10, wherein the performing the function of the online service using the generated employment type data comprises searching the online service for profiles of users that satisfy search criteria including at least an employment type criteria, the searching comprising determining whether the generated employment type data of the user satisfies the employment type criteria of the search criteria.

17. The system of claim 16, wherein the operations further comprise receiving a search request including the search criteria, wherein the generating of the employment type data and the searching of the online service are performed based on the receiving of the search request.

18. The system of claim 10, wherein the operations further comprise:
    transmitting a verification request to a computing device of the user, the verification request comprising the generated employment type data and a request for feedback regarding accuracy of the generated employment type data;
    receiving, from the computing device, feedback regarding the accuracy of the generated employment type data; and
    modifying the inference model based on the received feedback.

19. The system of claim 10, wherein the inference model is configured to generate the employment type data based on a set of conditions being indicated by the inference data, and the machine learning algorithm is configured to modify the inference model by:
    adding one or more conditions to the set of conditions;
    removing one or more conditions from the set of conditions; and
    changing a number of conditions in the set of conditions that are required to be indicated by the inference data in order for the inference model to generate the employment type data.

20. A non-transitory machine-readable medium embodying a set of instructions that, when executed by a processor, cause the processor to perform operations, the operations comprising:

detecting a lack of employment type data for a profile of a user on an online service, the employment type data identifying at least one type of employment;

based on the detecting of the lack of employment type data for the profile of the user, generating the employment type data based on an inference model and inference data, the inference data comprising at least one of profile data of the user or a history of the user's interactions with the online service; and performing a function of the online service using the generated employment type data.

* * * * *

UNITED STATES PATENT AND TRADEMARK OFFICE
CERTIFICATE OF CORRECTION

PATENT NO. : 11,138,509 B2
APPLICATION NO. : 15/699828
DATED : October 5, 2021
INVENTOR(S) : Yang et al.

Page 1 of 1

It is certified that error appears in the above-identified patent and that said Letters Patent is hereby corrected as shown below:

In the Claims

In Column 21, Line 65, in Claim 12, before "or", delete "and"

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*